March 10, 1964 J. P. NEWMAN 3,123,998
HARDNESS TESTER WITH TIMING DEVICE AND METHOD
Filed Nov. 17, 1961 2 Sheets-Sheet 1

INVENTOR.
JOHN P. NEWMAN
BY
ATTORNEYS.

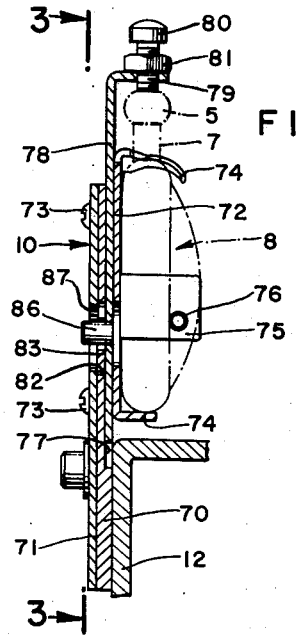
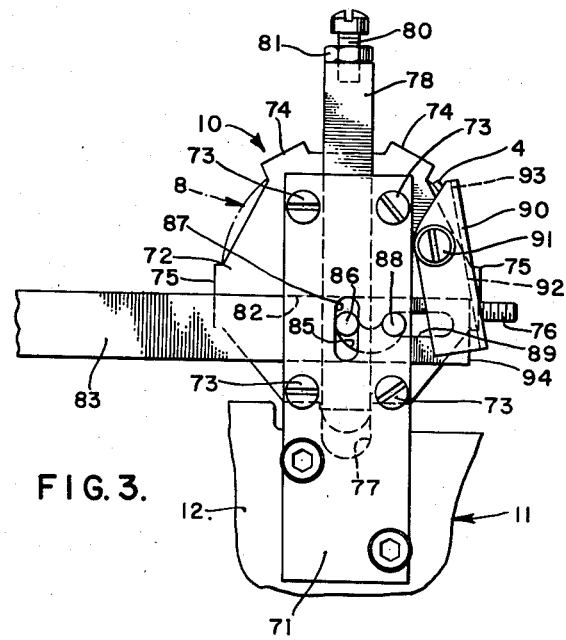
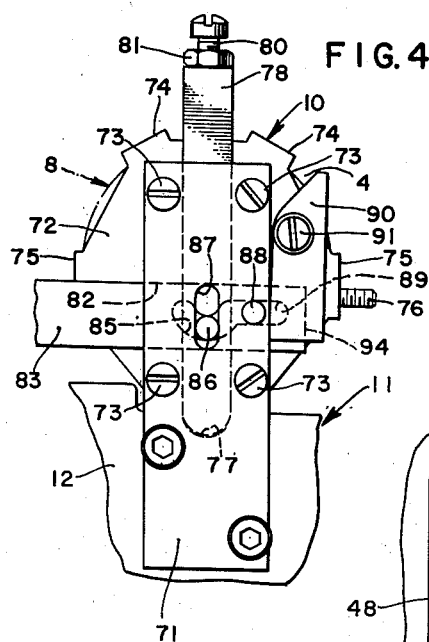
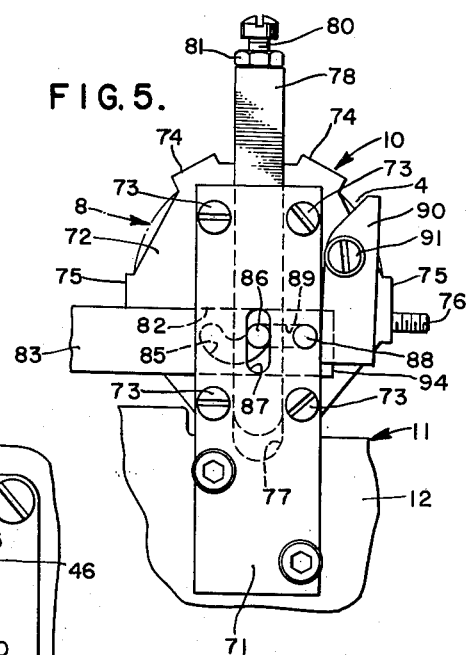
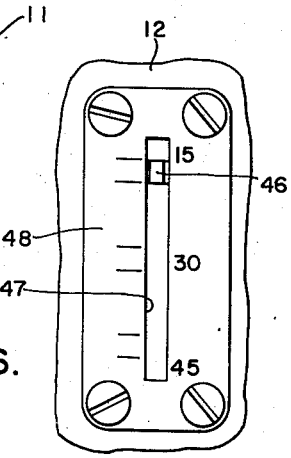

United States Patent Office 3,123,998
Patented Mar. 10, 1964

3,123,998
HARDNESS TESTER WITH TIMING DEVICE
AND METHOD
John P. Newman, P.O. Box 1147, San Jacinto, Calif.
Filed Nov. 17, 1961, Ser. No. 152,989
7 Claims. (Cl. 73—83)

This invention relates to a hardness tester with a timing device for imposing the major testing load for a predetermined period of time and, in particular, is directed to a machine for testing the hardness of materials which exhibit plastic flow characteristics.

Hardness testing machines or instruments of the Rockwell type operate by measuring the depth of penetration of a steel ball or diamond point into the specimen tested upon the application of a predetermined load. Standards have been established whereby with a particular size steel ball or diamond point penetrator and using a particular predetermined load, the depth of penetration into the specimen is read as a particular number on an arbitrary scale (as for example, Rockwell B or C) which corresponds to that penetrator and that predetermined load. In order to avoid possible errors due to original surface irregularities of the specimen and due to deformation around the indentation at the specimen's surface, an initial or "minor" load is applied through the penetrator before the heavier "major" load is applied. The particular reading on the scale is therefore an indication of the increment of penetration caused by the major load over the initial penetration caused by the minor load.

The accepted procedure in operating a Rockwell type machine is to apply the minor load through the penetrator to the specimen, usually measured by a certain number of revolutions of the dial needle, then to apply the major load until the needle comes to rest and finally to withdraw the major load and take the reading on the appropriate scale which thus indicates the hardness. With the materials usually tested on a Rockwell type machine, the dial needle comes to rest within a few seconds after application of the major load, thus indicating that for that specimen, that major load and that penetrator the maximum depth of penetration has been attained. However, it has been found that when using a Rockwell type tester for testing materials which exhibit a plastic flow such as thermoplastics or rubbers, the dial needle continues to turn or "creep" for a substantial period of time after the major load has been applied. The resultant hardness reading with such a material will be greatly affected by the duration of the application of the major load since the longer the load is applied, the greater the depth of penetration which results. Such a hardness reading is of little value since for a particular specimen different readings will be obtained by different operators of the testing machine or even by the same operator varying his procedure.

It has been found that by standardizing on the duration of application of the particular major load for the particular type penetrator, relatively consistent hardness values will result for a particular specimen. Thus, by establishing a predetermined duration of major load application, it is possible to adopt specifications using these hardness values and thereby permit reliable testing and quality inspection and control of products made of materials exhibiting plastic flow characteristics.

Accordingly it is therefore an object of this invention to provide a novel form of hardness tester wherein apparatus is provided for timing the duration of application of the major load to the specimen.

Another object of this invention is to provide a Rockwell type hardness tester wherein novel apparatus is provided for automatically starting a stop watch upon application of the major load and stopping and resetting the stop watch upon withdrawal of the major load.

A further object of this invention is to provide an apparatus for supporting a stop watch which may be mounted on a hardness tester and wherein means are provided for coupling the apparatus to the major load applying lever of the tester for starting the stop watch upon applying the major load and stopping and resetting the stop watch upon withdrawal of the major load.

A still further object of this invention is to provide a novel method for testing the hardness of materials exhibiting plastic flow characteristics and which yields consistent and reproduceable results.

Other and more detailed objects and advantages of this invention will appear from the following description and the accompanying drawings.

In the drawings:

FIGURE 2 is a sectional elevation view of the stop watch supporting and actuating apparatus taken substantially on the line 2—2 as shown in FIGURE 1.

FIGURE 3 is an elevation view taken substantially on the line 3—3 as shown in FIGURE 2, and illustrates the parts of the apparatus in their beginning position.

FIGURE 4 is a view similar to FIGURE 3 with the parts of the apparatus in an intermediate position.

FIGURE 5 is a view similar to FIGURE 3 with the parts of the apparatus in a finally actuated position.

FIGURE 6 is a fragmentary elevation view of that portion of the hardness testing machine shown in FIGURE 1 which indicates the amount of major load to be applied to the specimen.

Figure 1:
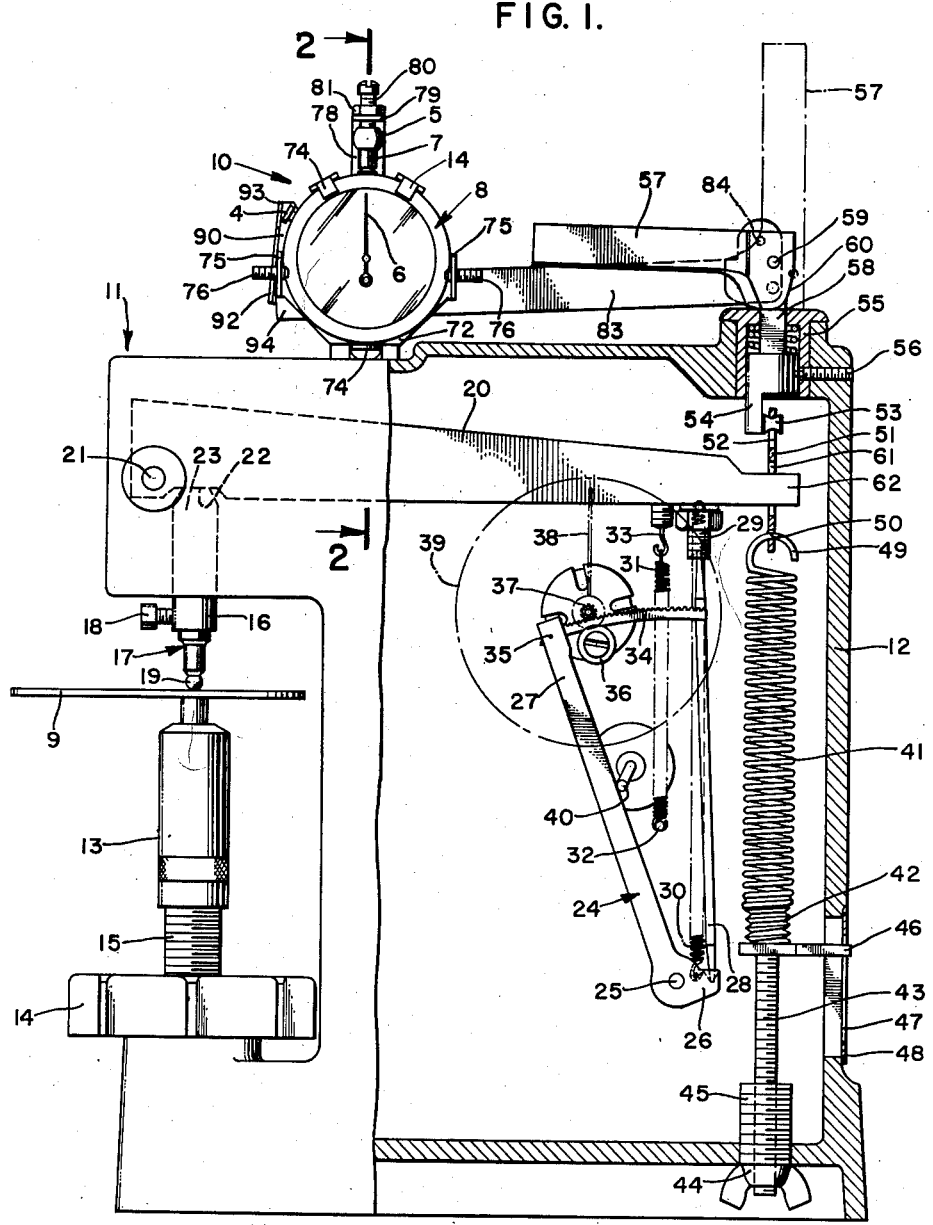
FIGURE 1 is an elevation view of a Rockwell type hardness testing machine with the apparatus of this invention installed thereon and showing portions of the machine in section for clarity.

Referring now to the drawings, the stop watch supporting and actuating mechanism, generally designated 10, is shown as mounted on a particular type hardness testing machine 11. Although the mechanism 10 is shown as being mounted on a hardness testing machine which is similar to that shown in my United States Letters Patent No. 2,674,875, it is to be understood and it will become apparent from the following description that the mechanism 10 may be used with various styles of Rockwell testing machines by appropriate coupling of the mechanism 10 to the member of the Rockwell testing machine which is actuated upon applying and withdrawing the major load.

The Rockwell testing machine 11 has a housing 12 preferably in the form of a casting which serves to support the various parts of the machine. An anvil 13 is provided for supporting the specimen 9 and is slidably and non-rotatably mounted relative to the housing 12. An adjusting nut 14 is threadedly received on the threaded portion 15 of the anvil 13 and serves to elevate and lower the anvil upon rotation of the adjusting nut 14. A plunger 16 is slidably mounted in the housing 12 for sliding motion toward and away from the anvil 13. The plunger 16 has an internal bore for receiving the penetrator assembly 17 and a set screw 18 is provided for locking the penetrator assembly 17 to the plunger 16. Various types of penetrator assemblies 17 having different types of penetrators 19 may be used for the particular type of specimen being tested such as is conventional with Rockwell hardness testing machines.

A power beam 20 is pivotally mounted to the housing 12 by pin 21 and may have a recessed portion 22 near the pivot pin 21 for engaging the upper end 23 of the plunger 16. Thus clockwise turning of the power beam 20, as viewed in FIGURE 1, causes downward movement of the plunger 16 toward the specimen 9 and anvil 13. The plunger 16 is urged in an upward direction by a light compression spring (not shown) in order to maintain engagement between the upper end 23 and the recessed portion 22. A plunger 16 is slidably retained in the housing 12 by any conventional means such as a keyway and pin (not shown) which will limit the extent of upward or downward travel of the plunger 16 relative to the housing 12.

Means are provided for indicating the movement of the plunger 16 and power beam 20 and as shown in the drawings, these means may include a bell crank 24 pivotally mounted on the housing 12 by pin 25 and having a short leg portion 26 and a long leg portion 27. A push rod 28 extends between the power beam 20 and the bell crank 24 and has its ends positioned in a recessed portion of an adjustable mounting 29 on the power beam 20 and in a recessed portion of the short leg 26 of the bell crank 24. A tension spring 30 extends between the short leg 26 of the bell crank and the power beam 20 to maintain the push rod 28 in operative engagement with the bell crank 24 and the power beam 20. Thus it may be seen that for a small angular movement of power beam 20, the bell crank 24 will have a much greater angular turning. By adjustment of the adjustable mounting 29 the angular position of bell crank 24 may be varied for any particular position of the power beam 20.

A tension spring 31 extends between a post 32 mounted on the housing 12 and a hook 33 secured to the power beam 20. The tension spring 31 serves to urge the power beam 20 in a downward or clockwise direction for imposing the minor load on the specimen when the specimen engages the penetrator and raises the plunger 16.

Means are provided for indicating the movement of plunger 16 on a dial and as shown in the drawings, these means may include a gear rack 34 mounted on the swinging extremity of the long leg 27 of the bell crank 24 by means of pin 35. The rack 34 is supported by guide bushing 36 mounted on the housing 12. A spur gear 37 is pivotally mounted relative to the housing 12 and engages the teeth of the gear rack 34 such that angular movement of the long leg 27 of the bell crank 24 causes lateral movement of the gear rack 34 which, in turn, causes rotation of the spur gear 37. The dial needle 38, shown with phantom lines, is mounted on the spur gear 37 and is positioned in front of the housing 12 so that visual readings of the position of the dial needle 38 may be taken on the dial 39, also shown with phantom lines.

Thus it may be seen that a small movement of plunger 16 causes a small angular movement of power beam 20 resulting in amplified movement of push rod 28 to cause a greatly amplified angular motion of bell crank 24 to, in turn, cause rotation of the dial needle 38 through the rack 34 and gear 37. An eccentric cam arm 40 is provided and extends through the housing 12 to permit external adjustment. The eccentric cam arm 40 serves as a stop for the long leg 27 to limit the angular movement in a clockwise direction, as viewed in FIGURE 1, and therefore in turn limits the downward motion of the plunger 16. In this manner when there is no load on the plunger 16 the long leg 27 of bell crank 24 will engage cam arm 40 and by adjusting cam arm 40 the location of dial needle 38 may be adjusted to the no load position.

The initial or minor load is applied by placing the specimen 9 on the anvil 13 and rotating the adjustment nut 14 so as to raise the anvil 13 and specimen 9 upwardly against the penetrator 19, thereby urging the plunger 16 in an upward direction. The upward movement of plunger 16 is resisted by the tension spring 31 through the power beam 20. Continued turning of adjusting nut 14 imposes the desired minor load as well as raising the power beam 20 thereby causing counterclockwise turning of the bell crank 24 and resultant clockwise rotation of the dial needle 38. The dial needle 38 is rotated the desired amount, usually two turns, in order to impose the desired minor load as well as provide adequate stroke for the plunger 16 when the major load is applied so that the bell crank 24 does not engage the eccentric cam arm 40 upon the application of the major load.

Means are provided for imposing the major load upon the power beam 20 and as shown in the drawings these means may include a pretension heavy tension spring 41 adapted to urge the power beam 20 downward when desired. The spring 41 is mounted on a post 42 which is secured to a threaded shank 43. A wing nut 44 is threadedly received on the shank 43 and seats against a bushing 45 mounted in the housing 12. The tension in spring 41 may be varied by turning the wing nut 44 thereby raising or lowering the shank 43 and post 42. An indicator arm 46 extends through a slot 47 in a plate 48 mounted on the housing 12 for indicating the position of the lower end of the spring 41 relative to the housing. By proper calibration of the plate 48, as shown in FIGURE 6, the major load which will be applied, as hereinafter described, may be varied by turning the wing nut 44 to position the indicator arm 46 opposite the particular major load desired.

The upper end of the spring 41 is formed into a hook 49 which is received in an aperture 50 provided in the lower end of plate 51. A second aperture 52 in the upper end of the plate 51 is provided for receiving the post 53 of an actuating plunger 54. A bushing 55 is mounted in the housing 12 for receiving the plunger 54. A screw 56 may be threadedly received in the housing 12 and have a pin end adapted to be positioned in a keyway on the plunger 54 to limit the rotational movement of the plunger. A loading lever 57 is pivotally mounted on the upward extension 58 of the plunger 54 by means of pivot pin 59. The loading lever 57 is provided with a cam surface 60 for engaging the upper surface of the bushing 55 such that when the loading lever 57 is in a horizontal position, the plunger 54 is raised to its uppermost position and by pivoting the loading lever to a vertical position, as shown by phantom lines in FIGURE 1, the plunger 54 is lowered to its lowermost position.

An oversized aperture 61 is provided in the plate 51 for receiving the end portion 62 of the power beam 20. With the loading lever 57 in a horizontal position, the aperture 61 is of a size sufficient to permit the movement of the power beam 20 which occurs during application of the minor load as heretofore described. Upon raising of the loading lever 57 from the horizontal position to the vertical position, the plunger 54 is lowered thereby lowering the plate 51 to engage the end portion 62 of the power beam and thereby apply the full load of the pretensioned spring 41 to the power beam 20. This downward force on the power beam 20 is transmitted to the plunger 16 causing an increased force by the penetrator 19 on the specimen 9 and a resultant penetration of the penetrator 19 into the specimen 9. This penetration in turn results in a downward movement of plunger 16 and power beam 20 thereby causing clockwise turning of the bell crank 24 which is in turn registered by the rotation of the dial needle 38 as heretofore described. By pivoting the loading lever 57 from the vertical position to the horizontal position, the plate 51 is raised through plunger 54 to withdraw the major load from the power beam 20. With the major load withdrawn the depth of penetration of the penetrator 19 into the specimen 9, as caused by the major load, is indicated by the dial needle 38 on the dial 39 as is conventional with Rockwell type testing machines.

Means are provided for starting, stopping and resetting a stop watch mounted on the hardness testing machine by operation of the major load applying lever and, as shown in the drawings, these means may be comprised of the mechanism generally designated 10. The frame of the stop watch supporting an actuating mechanism 10 may be comprised of a guide member 70, a cover plate 71 and a support plate 72. The guide member 70 is positioned between the cover plate 71 and the support plate 72 and the three elements of the frame are secured together by four screws 73. The support plate 72 is provided with three locating fingers 74 for positioning and supporting the stop watch 8. A pair of tabs 75 on the support plate 72 are positioned on either side of the stop watch 8 and threadedly receive set screws 76 for locking the stop watch 8 in position on the support plate 72.

The stop watch 8 may be of conventional design wherein in-out movement of the stem 7 causes starting of the hand 6 of the watch and a second in-out movement of the stem 7 causes stopping of the hand 6. The watch may be wound by rotating knob 5 when desired. The hand 6 may be reset to the zero position, as illustrated in FIGURE 1, by pushing inwardly on the reset button 4.

The guide member 70 is provided with a vertical milled slot 77 for receiving and guiding the vertical sliding motion of an operating lever 78. The upper end of the operating lever 78 is provided with a tab 79 which threadedly receives an adjusting screw 80. The screw 80 is adjusted to engage the top of the stem 7 of the stop watch 8. A lock nut 81 is provided for locking the adjusting screw 80 in the desired position.

The guide member 70 is also provided with a horizontal milled slot 82 for receiving and guiding the actuating lever 83. The milled slot 77 is laterally offset from the milled slot 82 as viewed in FIGURE 2 so that the operating lever 78 does not intersect the actuating lever 83. The actuating lever 83 is pivotally and eccentrically mounted on the loading lever 57 by means of pin 84 such that movement of the loading lever 57 from the horizontal position to the vertical position causes movement of the actuating lever 83 from left to right as viewed in FIGURE 1. The lever 83 is provided with a cam slot 85 of the general shape illustrated in FIGURES 3, 4 and 5. A pin 86 is mounted on the operating lever 78 and extends through the cam slot 85 and a guide slot 87 provided in the cover plate 71. A guide pin 88 is secured to the cover plate 71 and passes through the slotted extension 89 of the cam slot 85 for further guiding the relatively horizontal movement of the actuating lever 83.

Raising the loading lever 57 from the horizontal position to the vertical position causes right to left movement of actuating lever 83 as viewed in FIGURES 3, 4 and 5. Due to the engagement of the pin 86 with the cam slot 85 the right to left movement of lever 83 causes downward sliding movement of the operating lever 78 to the position shown in FIGURE 4 and then upward sliding movement of the lever 78 to the position shown in FIGURE 5. This vertical reciprocation of operating lever 78 causes reciprocation of the stem 7 to start the hand 6 of the stop watch at the same time that the major load is applied to the power beam 20, as heretofore described. Lowering of the loading lever 57 from the vertical to the horizontal position causes left to right movement of the actuating lever 83 as viewed in FIGURES 3, 4 and 5. This left to right movement causes vertical reciprocation of the actuating lever 78 to stop the hand 6 of the stop watch at the same time that the major load is withdrawn from the power beam 20.

Means are provided for resetting the hand 6 of the stop watch to zero and, as shown in the drawings, these means may include a cam lever 90 pivotally mounted on and spaced from the support plate 72 by screw 91 and a bushing (not shown). A flange 92 of the cam lever 90 extends substantially perpendicular to the support plate 72 and has a projection 93 near its upper end which extends beyond the support plate 72 into position for engagement with the reset button 4 of the stop watch. With the hand 6 of the stop watch running as previously described, the cam lever 90 is in the position shown in FIGURE 5 and the projection 93 is out of engagement with the reset button 4. As the actuating lever 83 is moved from left to right to stop the hand 6 of the stop watch as described, the end 94 of the actuating lever 83 engages the flange 92 of the cam lever 90 to cause turning of the cam lever in a counterclockwise direction about the pivot screw 91. This counterclockwise movement causes the projection 93 to engage the reset button 4 to depress the reset button and thereby reset the hand 6 of the stop watch to the zero position. As the right to left movement of the actuating lever 83 progresses to start the stop watch as described, the cam lever 90 turns in a clockwise direction so that the projection 93 becomes disengaged from the reset button 4 to permit the hand 6 of the stop watch to start running upon completion of the actuating of the stem 7.

Thus it may be seen that by operating the hardness testing machine in a normal manner the stop watch is started upon application of the major load and is stopped and reset upon withdrawal of the major load. By establishing a standard time period, such as for example ten seconds, the hardness reading for a particular specimen which exhibits plastic flow characteristics will be consistent regardless of the operator and independent of his personal technique.

Having fully described my invention, it is to be understood that I do not wish to be limited to the details herein set forth or to the details illustrated in the drawings, but my invention is of the full scope of the appended claims.

I claim:

1. In an apparatus for use with a hardness testing machine for actuating the start-stop button and the reset button of a stop watch upon the actuation of the loading lever of the machine to impose the major load to the test specimen, the combination of: a frame for supporting the stop watch, an actuating lever movably mounted on said frame, an operating lever movably mounted on said frame and having means for engaging and operating the start-stop button of the stop watch, means on said operating lever engaging said actuating lever for causing movement of the operating lever to operate the start-stop button upon movement of said actuating lever, means movably mounted on said frame for operating the reset button of the stop watch, means on said actuating lever for engaging and moving the said reset button operating means to operate the reset button upon movement of said actuating lever, and means for connecting said actuating lever to the loading lever for causing movement of said actuating lever upon actuation of the loading lever.

2. In an apparatus for use with a hardness testing machine for actuating the start-stop button and the reset button of a stop watch upon the actuation of the loading lever of the machine to impose the major load to the test specimen, the combination of: a frame for supporting the stop watch, an actuating lever slidably mounted on said frame, an operating lever slidably mounted on said frame and having means for engaging and operating the start-stop button of the stop watch upon sliding reciprocation of said operating lever, means on said operating lever engaging said actuating lever for causing sliding reciprocation of the operating lever upon sliding movement of said actuating lever, means pivotally mounted on said frame for operating the reset button of the stop watch upon pivotal movement, means on said actuating lever for engaging and pivoting said pivotally mounted means upon sliding movement of said actuating lever, and means for connecting said actuating lever to the loading lever for causing sliding movement of said actuating lever upon actuation of the loading lever.

3. In an apparatus for use with a hardness testing machine for actuating the start-stop button and the reset button of a stop watch upon the actuation of the loading lever of the machine to impose the major load to the test specimen, the combination of: a frame for supporting the stop watch, an actuating lever slidably mounted on said frame, said actuating lever having a cam surface, an operating lever slidably mounted on said frame and having means for engaging and operating the start-stop button of the stop watch upon sliding reciprocation of said operating lever, means on said operating lever for engaging said cam surface to cause sliding reciprocation of the operating lever upon sliding movement of said actuating lever, means pivotally mounted on said frame for operating the reset button of the stop watch upon pivotal movement, means on said actuating lever for engaging and pivoting said pivotally mounted means upon sliding movement of said actuating lever, and means for connecting said actuating lever to the loading lever for causing sliding movement of said actuating lever upon actuation of the loading lever.

4. In an apparatus for testing the hardness of a specimen by penetrating the specimen with a penetrator under a predetermined major load for a predetermined period of time as measured by a stop watch having a start-stop button and a reset button, the combination of: a housing, means mounted in said housing for applying the predetermined major load to the specimen through the penetrator, said means having a loading lever pivotally mounted relative to said housing for applying the major load upon pivoting in one direction and withdrawing the major load upon pivoting in the reverse direction, a frame mounted on said housing for supporting the stop watch, an operating lever slidably mounted on said frame for actuating the start-stop button upon sliding movement, a cam lever pivotally mounted on said frame for operating the reset button upon pivotal movement, and an actuating lever pivotally and eccentrically mounted on said loading lever, said actuating lever having means for engaging said operating lever and said cam lever for causing sliding of the operating lever and pivoting of the cam lever upon pivoting of said loading lever.

5. In an apparatus for testing the hardness of a specimen by penetrating the specimen with a penetrator under a predetermined major load for a predetermined period of time as measured by a stop watch having a start-stop button and a reset button, the combination of: a housing, an anvil on said housing for supporting the specimen, a plunger slidably mounted on said housing and supporting the penetrator for movement toward said anvil, means mounted in said housing for applying the predetermined major load to said plunger to cause movement of the plunger toward said anvil for penetrating the specimen, said means having a loading lever pivotally mounted relative to said housing for applying the major load upon pivoting in one direction and withdrawing the major load upon pivoting in the reverse direction, a frame mounted on said housing for supporting the stop watch, an operating lever slidably mounted on said frame for actuating the start-stop button upon sliding movement, a cam lever pivotally mounted on said frame for operating the reset button upon pivotal movement, and an actuating lever pivotally and eccentrically mounted on said loading lever, said actuating lever having means for engaging said operating lever and said cam lever for causing sliding of the operating lever and pivoting of the cam lever upon pivoting of said loading lever, whereby pivoting of the loading lever to apply the major load causes sliding of the operating lever to actuate the start-stop button for starting the watch and pivoting of the loading lever to withdraw the major load causes sliding of the operating lever to again actuate the start-stop button for stopping the watch and also causes pivoting of the cam lever to reset the watch.

6. In an apparatus for testing the hardness of a specimen by penetrating the specimen with a penetrator under a predetermined major load for a predetermined period of time as measured by a stop watch having a start-stop button and a reset button, the combination of: a housing, an anvil on said housing for supporting the specimen, a plunger slidably mounted in said housing and supporting the penetrator for movement toward said anvil, means mounted in said housing for applying the predetermined major load to said plunger to cause movement of the plunger toward said anvil for penetrating the specimen, said means having a loading lever pivotally mounted relative to said housing for applying the major load upon pivoting in one direction and withdrawing the major load upon pivoting in the reverse direction, a frame mounted on said housing for supporting the stop watch, an operating lever slidably mounted on said frame for actuating the start-stop button upon sliding movement, a cam lever pivotally mounted on said frame for operating the reset button upon pivotal movement, and an actuating lever pivotally and eccentrically mounted on said loading lever, said actuating lever having a cam surface for engaging said operating lever for causing sliding reciprocation of the operating lever upon pivoting of said loading lever, means on said actuating lever for causing pivotal movement of said cam lever upon pivoting of said loading lever whereby pivoting of the loading lever to apply the major load causes sliding reciprocation of the operating lever to actuate the start-stop button for starting the watch and pivoting of the loading lever to withdraw the major load causes sliding reciprocation of the operating lever to again actuate the start-stop button for stopping the watch and also causes pivoting of the cam lever to reset the watch.

7. In a method for testing the hardness of specimens exhibiting plastic flow characteristics comprising the steps of: applying a load to the specimen over a small area to cause a penetration, applying such load for a predetermined period of time less than the period of time necessary for that penetration to discontinue, removing the load from the specimen, and measuring the depth of penetration into the specimen at that small area caused by the load for determining the hardness.

References Cited in the file of this patent

UNITED STATES PATENTS

| | | |
|---|---|---|
| 2,619,831 | Sklar | Dec. 2, 1952 |
| 2,674,875 | Newman | Apr. 13, 1954 |